United States Patent
Lee et al.

(10) Patent No.: US 8,917,640 B2
(45) Date of Patent: Dec. 23, 2014

(54) METHOD AND APPARATUS FOR HANDLING SIGNALS USED FOR DELAY TOLERANT ACCESS IN A WIRELESS COMMUNICATION SYSTEM

(71) Applicant: LG Electronics Inc., Seoul (KR)

(72) Inventors: Ki Dong Lee, San Diego, CA (US);
Sang Gook Kim, San Diego, CA (US)

(73) Assignee: LG Electronics Inc., Seoul (KR)

( * ) Notice: Subject to any disclaimer, the term of this patent is extended or adjusted under 35 U.S.C. 154(b) by 192 days.

(21) Appl. No.: 13/683,814

(22) Filed: Nov. 21, 2012

(65) Prior Publication Data
US 2013/0128733 A1    May 23, 2013

Related U.S. Application Data

(60) Provisional application No. 61/563,495, filed on Nov. 23, 2011.

(30) Foreign Application Priority Data

Nov. 21, 2012    (WO) ............... PCT/KR2012/009856

(51) Int. Cl.
*H04B 7/00* (2006.01)
*H04J 3/17* (2006.01)
*H04W 74/02* (2009.01)
*H04W 74/08* (2009.01)
*H04W 74/04* (2009.01)
*H04W 72/12* (2009.01)

(52) U.S. Cl.
CPC ............. *H04W 74/02* (2013.01); *H04W 74/08* (2013.01); *H04W 74/04* (2013.01); *H04W 72/1284* (2013.01); *H04W 74/0833* (2013.01); *H04W 74/0858* (2013.01); *H04W 74/0841* (2013.01); *H04W 74/085* (2013.01)

USPC ............................. 370/310; 370/329; 455/434

(58) Field of Classification Search
CPC .................... H04W 74/0841; H04W 74/0858; H04W 74/085; H04W 74/0833; H04W 74/08; H04W 74/00; H04W 74/02; H04W 74/04
USPC ......... 370/252, 254, 310, 328, 329, 345, 347, 370/348, 349; 455/434, 545
See application file for complete search history.

(56) References Cited

U.S. PATENT DOCUMENTS

| | | |
|---|---|---|
| 2010/0260156 A1 | 10/2010 | Lee et al. |
| 2011/0170503 A1 | 7/2011 | Chun et al. |
| 2011/0243075 A1 | 10/2011 | Luo et al. |

FOREIGN PATENT DOCUMENTS

EP    2 365 720 A2    9/2011

*Primary Examiner* — Kwang B Yao
*Assistant Examiner* — Adam Duda
(74) *Attorney, Agent, or Firm* — Birch, Stewart, Kolasch & Birch, LLP (57) ABSTRACT

The present description proposes a user equipment for processing data related to contention-based random access in a wireless communication system. The present description proposes to separately handle random access related parameters according to access type of a user equipment. Examples of the access type include normal access and delay tolerant access. In detail, a system information block indicating a first maximum number of preamble transmission applicable to a first type UE performing normal access and a second maximum number of preamble transmission applicable to a second type UE performing delay tolerant access is proposed. Further, back-off interval information used to indicate first type back-off interval information applicable to the first type UE and second type back-off interval information applicable to the second type UE is proposed.

7 Claims, 8 Drawing Sheets

METHOD AND APPARATUS FOR HANDLING SIGNALS USED FOR DELAY TOLERANT ACCESS IN A WIRELESS COMMUNICATION SYSTEM

CROSS-REFERENCE TO RELATED APPLICATIONS

The present application for patent claims priority to Provisional Application No. 61/563,495 filed on Nov. 23, 2011, and International Application No. PCT/KR2012/009856 filed on Nov. 21, 2012, which are incorporated herein by reference.

BACKGROUND OF THE INVENTION

1. Field of the Invention

The technical features of this document relate to delay tolerant access in wireless communications, and more particularly, to a method and apparatus for performing random access procedure for a terminal with delay tolerant access.

2. Related Art

The Third Generation Partnership Project (3GPP) Long Term Evolution (LTE) which is a set of enhancements to the Universal Mobile Telecommunications System (UMTS) is introduced as 3GPP Release 8. The 3GPP LTE uses orthogonal frequency division multiple access (OFDMA) for a downlink, and uses single carrier frequency division multiple access (SC-FDMA) for an uplink, and adopts multiple input multiple output (MIMO) with up to four antennas. In recent years, there is an ongoing discussion on 3GPP LTE-Advanced (LTE-A), which is a major enhancement to the 3GPP LTE.

Machine to machine (M2M) communication or machine-type communication (MTC) is the communication between machines that do not necessarily need human intervention. The 3GPP has started an effort to determine potential network optimizations that could lower the operational costs associated with offering these new M2M services.

SUMMARY OF THE INVENTION

The present description proposes a user equipment for processing data related to contention-based random access in a wireless communication system. The present description proposes to separately handle random access related parameters according to access type of a user equipment. Examples of the access type include normal access and delay tolerant access. In detail, a system information block indicating a first maximum number of preamble transmission applicable to a first type UE performing normal access and a second maximum number of preamble transmission applicable to a second type UE performing delay tolerant access is proposed. Further, back-off interval information used to indicate first type back-off interval information applicable to the first type UE and second type back-off interval information applicable to the second type UE is proposed.

In the present description, a method of processing data related to contention-based random access in a wireless communication system using a number of orthogonal frequency division multiplexing (OFDM) symbols is proposed.

In one design, the method comprises: receiving system information including preamble transmission number information via a system information block (SIB), wherein the preamble transmission number information is used to indicate a first maximum number of preamble transmission applicable to a first type UE performing normal access and a second maximum number of preamble transmission applicable to a second type UE performing delay tolerant access; performing random access by transmitting a preamble based on the preamble transmission number information; receiving, in response to the preamble, a random access response including back-off interval information, wherein the back-off interval information is used to indicate first type back-off interval information applicable to the first type UE and second type back-off interval information applicable to the second type UE; transmitting, in response to the random access response, a scheduled message; determining whether contention with respect to the scheduled message is resolved by receiving a contention resolution message; and if the contention is not resolved, performing a back-off operation based on the back-off interval information In another design, the method comprises: receiving system information including preamble transmission number information via a system information block (SIB), wherein the preamble transmission number information indicates a first maximum number of preamble transmission applicable to normal access; determining whether access attempted by the UE is normal access or delay tolerant access; if the UE attempts the delay tolerant access, configuring a second maximum number of preamble transmission by using the first maximum number of preamble transmission, wherein the second maximum number of preamble transmission is applicable to the delay tolerant access; performing random access by transmitting a preamble based on the preamble transmission number information; receiving, in response to the preamble, a random access response including back-off interval information, wherein the back-off interval information is used to indicate first type back-off interval information applicable to the normal access; if the UE attempts the delay tolerant access, configuring second type back-off interval information by using the first type back-off interval information, wherein the second type back-off interval information is applicable to the delay tolerant access; transmitting, in response to the random access response, a scheduled message; determining whether contention with respect to the scheduled message is resolved by receiving a contention resolution message; and if the UE attempts the delay tolerant access, performing a back-off operation based on the second type back-off interval information when the contention is not resolved.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). The $3^{rd}$ generation partnership project (3GPP) long term evolution (LTE) is a part of an evolved UMTS (E-UMTS) using the E-UTRA. The 3GPP LTE uses the OFDMA in the downlink and uses the SC-FDMA in the uplink.

For clarity of explanation, the following description will focus on the 3GPP and its evolution. However, the technical features of this description are not limited thereto.

Figure 1:
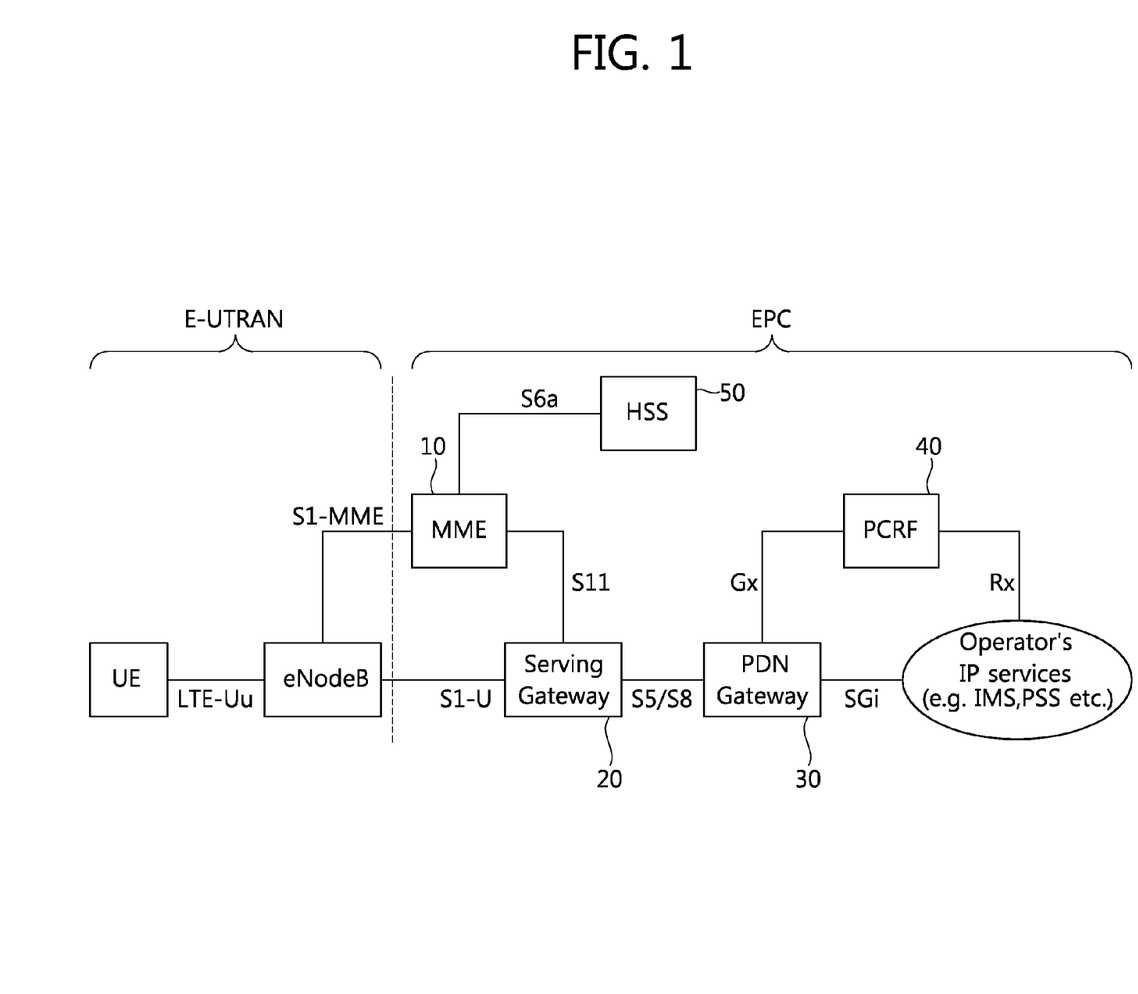
FIG. 1 is a view illustrating an Evolved Packet System which is associated with the Long Term Evolution (LTE) system.

FIG. 1 is a view illustrating an Evolved Packet System which is associated with the Long Term Evolution (LTE) system. The LTE system aims to provide seamless Internet Protocol (IP) connectivity between a user equipment (UE) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of 'EPS bearers' to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers. As depicted in FIG. 1, the node (logical or physical) of the EPC in the SAE includes a Mobility Management Entity (MME) 10, a PDN gateway (PDN-GW or P-GW) 30, a Serving Gateway (S-GW) 20, a Policy and Charging Rules Function (PCRF) 40, a Home subscriber Server (HSS) 50, etc.

The MME 10 is the control node which processes the signaling between the UE and the CN. The protocols running between the UE and the CN are known as the Non-Access Stratum (NAS) protocols. Examples of functions supported by the MME 10 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 20 serves as the local mobility anchor for the data bearers when the UE moves between eNodeBs. All user IP packets are transferred through the S-GW 20. The S-GW 20 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 30 serves to perform IP address allocation for the UE, as well as QoS enforcement and flow-based charging according to rules from the PCRF 40. The P-GW 30 performs QoS enforcement for Guaranteed Bit Rate (GBR) bearers. It also serves as the mobility anchor for inter-working with non-3GPP technologies such as CDMA2000 and WiMAX networks.

The PCRF 40 serves to perform policy control decision-making, as well as for controlling the flow-based charging functionalities.

The HSS 50, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Figure 2:
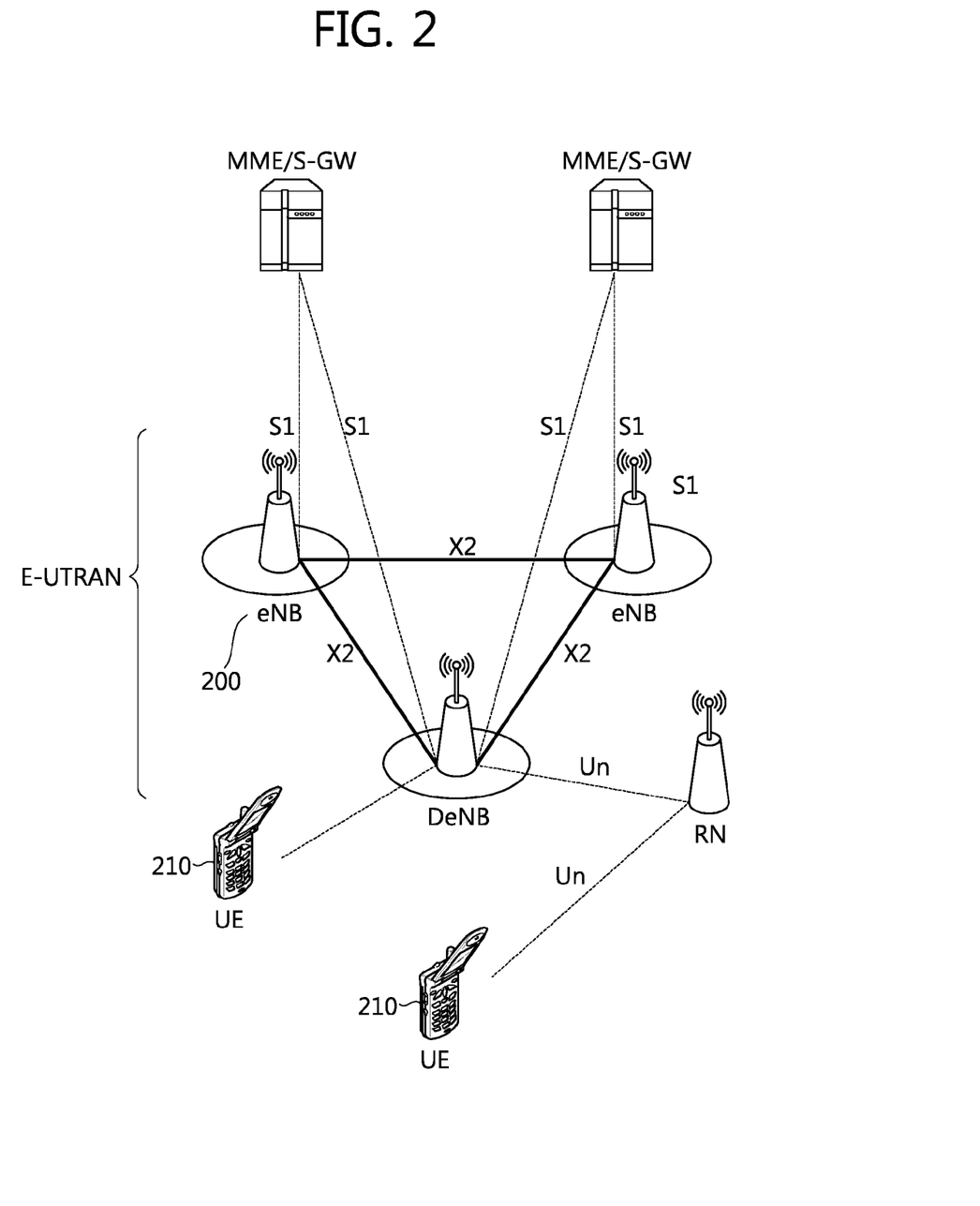
FIG. 2 is a view illustrating an overall architecture of the E-UTRAN to which the following technical features are applied.

FIG. 2 is a view illustrating an overall architecture of the E-UTRAN to which the following technical features are applied.

The E-UTRAN includes at least one eNB (evolved-Node B) 200 providing a user plane and a control plane towards a user equipment (UE) 210. The UE can be fixed or mobile and can be referred to as another terminology, such as a MS (Mobile Station), a UT (User Terminal), an SS (Subscriber Station), an MT (mobile terminal), a wireless device, or the like. The eNB 200 may be a fixed station that communicates with the UE 100 and can be referred to as another terminology, such as a base station (BS), a NB (NodeB), a BTS (Base Transceiver System), an access point, or the like.

The protocols running between the eNBs 200 and the UE 210 are known as the Access Stratum (AS) protocols.

The BSs (or eNBs) 200 are interconnected with each other by means of an X2 interface. The BSs 200 are also connected by means of the S1 interface to the aforementioned EPC (Evolved Packet Core) elements, more specifically to the Mobility Management Entity (MME) by means of the S1-MME and to the Serving Gateway (S-GW) by means of the S1-U.

Further, the E-UTRAN can additionally provide relay functionality. The E-UTRAN can include a Donor eNB (DeNB) that provides at least one Relay Node (RN), with access to the core network. Between the DeNB and RN, an Un interface is defined, whereas an Uu interface is further defined between the RN and the UE.

Here, features related to delay tolerant access (DTA), as opposite to normal access, are further explained. While normal access is associated with communication necessarily need human intervention, the DTA is associated with machine type communication (MTC) between machines that do not necessarily need human intervention, and the 3GPP has started an effort to determine potential network optimizations. The MTC, which is also referred to as machine-to-machine (M2M), is expected to have applications in areas, such as smart metering, home automation, e-Health, fleet management, etc. In 3GPP LTE, the support of MTC (or M2M) nodes (or interchangeably delay-tolerant access or low priority access) requires very efficient operating mechanisms and protocols for the traffic channel and random access channel.

DTA or MTC has a number of unique characteristics which may be used to optimize the usage of the operator network. These characteristics include, for example: mostly data-centric communication (voice not expected), a potentially large number of communicating terminals, a low traffic volume per terminal, a potentially low mobility for some devices, and potentially power-limited devices.

Hereinafter, random access procedure is explained. The random access procedure can be initiated with an Access Class (AC) barring, which is also referred to as AC barring, ACB (Access Class Barring), or ABC (Access class Barring check). Further, AC barring applied to LTE system can be referred to as LTE ACB, or Rel-10 ACB. In 3GPP, each UE belongs to an AC in the range 0-9. In addition, some UEs may belong to one or more high priority ACs in the range 11-15, which are reserved for specific uses, e.g., security services, public utilities, PLMN staff, etc. AC 10 is used for emergency access.

For AC barring, the UE checks if access is barred for all its applicable ACs, and relevant control information is transmitted via SystemInformationBlockType2 (SIB2). SIB2 may include a set of AC barring parameter for Mobile Originated (MO) calls and/or MO signaling. This set of parameters comprises a probability factor and a barring time for ACs 0-9 and a list of barring bits for ACs 11-15. For ACs 0-9, if the UE initiates an MO call and the relevant parameters are included, the UE draws a random number. If the drawn number exceeds the probability factor, access is not barred. Otherwise access is barred for a duration which is randomly selected based on the broadcasted barring time value. For ACs 11-15, if the UE initiates an MO call and the relevant AC barring parameters are included; access is barred whenever the bit corresponding to all of the UE's AC is set. The behavior is similar in the case of UE-initiated MO signaling.

Figure 3:
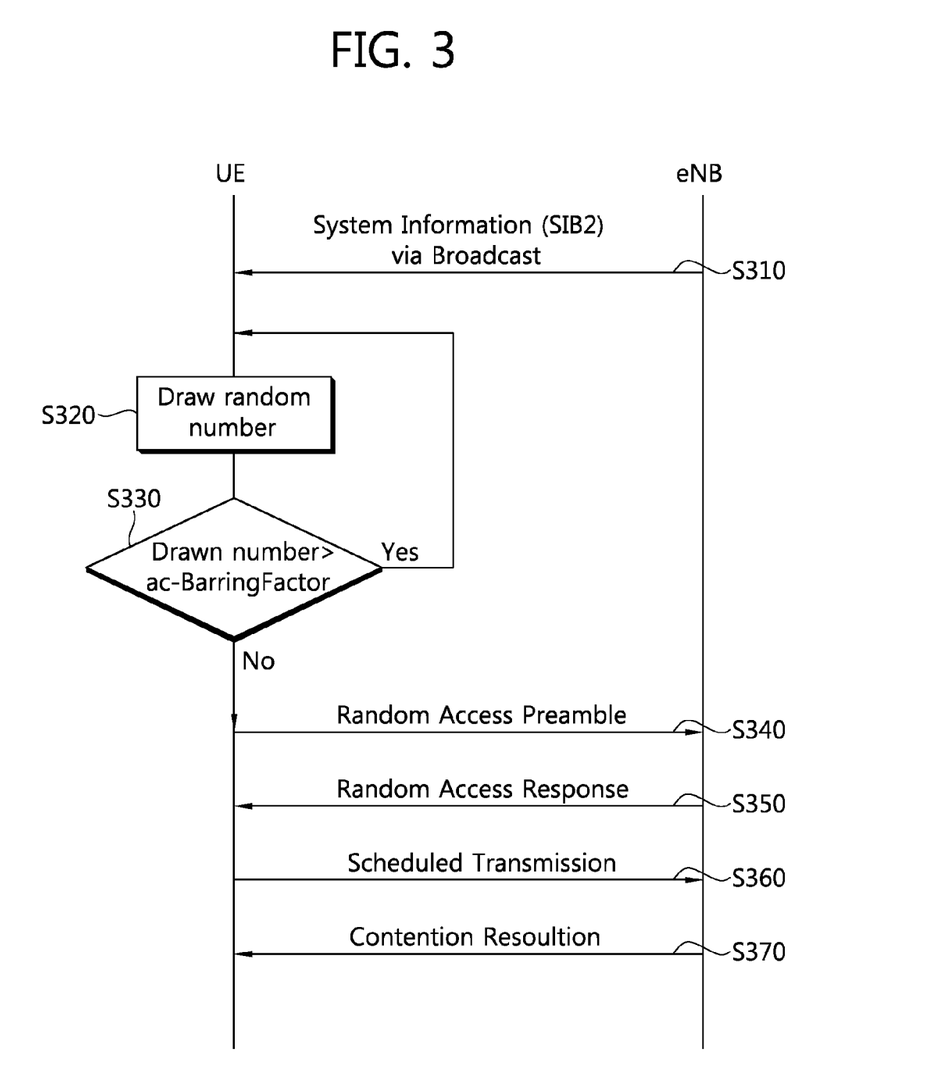
FIG. 3 is a flow diagram showing a random access procedure which is used for an embodiment of the proposed method.

FIG. 3 is a flow diagram showing a random access procedure which is enhanced by an embodiment of the proposed mechanism.

In order to obtain new connection (e.g., a data connection or signaling connection) UEs first performs a RA procedure and this is a common feature in most cellular system. Further, the RA procedure can be categorized into contention-based and contention-free. The example depicted in FIG. 3 is directed to the contention-based RA procedure.

In step S310, the relevant parameters are transmitted from a base station (e.g., eNB). Various control information can be broadcasted via 'System information', such as Master Information Block (MIB) and System Information Block type k (k=1, 2, . . . ), and the relevant parameters associated with the AC barring are broadcasted via SIB2, as discussed above. As explained above, SIB2 provides information for UEs how they perform the RA procedure. The SIB2 further includes a value for 'ac-BarringFactor', which indicates the probability that a certain UE is supposed to be prevented from attempting the RA procedure to a certain cell. In case of an ordinary call (i.e., MO data call), in step S320, the UE shall draw a random number from a uniform distribution (0, 1). If the random number drawn is less than the 'ac-BarringFactor', the UE performs subsequent steps of the RA procedure (S330).

In step S340, a UE selects a particular random access preamble and certain Random Access Channel (RACH) resources from an available random access preamble set and RACH resources, and transmits the selected random access preamble on the selected RACH to an eNB.

In step S350, the eNB receives the random access preamble, and then transmits a random access response to the UE. Further, the random access response includes a time advance (TA) and uplink radio resource allocation information for the transfer of a scheduled message, and also includes an index of the received random access response so that the UE can determine whether the random access response is for the UE. The random access response transmitted on a DL-SCH (downlink-shared channel) may be specified by a DL L1/L2 (downlink layer 1/layer 2) control channel indicated by a random access-radio network temporary identity (RA-RNTI).

In step S360, the UE receives the random access response, and then transmits the scheduled message according to radio resource allocation information included in the random access response. The scheduled message, which is also referred to as a 'Message 3', may include a radio resource control (RRC) connection request message.

In step S370, the BS receives the scheduled message from the UE, and then transmits a contention resolution message, which is also referred to as a Message 4, to the UE. In order to check whether contention occurs with respect to the Message 3, a contention resolution timer is initiated after transmitting the Message 3. If the Message 4 is not successfully received until the contention resolution timer expires, step S370 may be repeated based on predefined configuration.

After the RRC connection request message (S360) is received by the network, an RRC connection can be successfully established and the UE enters an RRC connected mode. However, the RRC connection request may be rejected, and the UE may thereafter receive an 'RRCConnectionReject' message from the eNB. Further, the UE may consider that the RRC connection requested is regarded as rejected without explicitly receiving the 'RRCConnectionReject' when the contention resolution timer expires without receiving the Message 4. In these cases, a certain delay, which is referred to as 'wait time' in 3GPP context, can be applied before performing the AC barring to avoid the large number of UE-initiated call attempts. In particular, the UE is required to avoid a subsequent AC barring during the wait time, which is indicated by the network. In the standard, a range of the wait time is set to [1, 16 (sec)]. In addition, if an 'RRCConnectionRelease' message is received by a UE, the wait time is also applied before performing the AC barring. The RRCConnectionRelease message is received when the RRC Connection is released after the RRC connection is successfully established. Recently, 3GPP has newly introduced an 'extended-WaitTime', which is an extended version of the above-mentioned wait time. Accordingly, the extended wait time is applicable to a case where a request for RRC connection is regarded as rejected or an RRC connection is released. Meanwhile, the extended wait time can be additionally used with the wait time. Namely, for a certain UE, both the wait time and the extended wait time can be applied.

Recently, the concept of 'extended access barring (EAB)' has been introduced for DTA. While the above-identified AC barring is associated with conventional communication scheme, which necessarily needs human intervention, the EAB is generally used for DTA. Namely, the present description is related to extended access barring (EAB), which is applicable to UEs supporting delay tolerant (e.g., MTC, M2M, lower priority) services. In other words, the present description can be beneficial to a UE configured for EAB. The UE configured for/with EAB implies a UE which supports delay-tolerant access (DTA) and/or low priority access. Any MTC or M2M nodes can be the UE configured for/with EAB.

As discussed above, the EAB which is applicable to delay tolerant services is corresponding to the aforementioned Access Class (AC) barring procedure which is applicable to conventional human to human (H2H) communication. Further, the EAB can be performed together with or instead of the conventional AC barring (i.e., legacy AC barring). For instance, EAB may not be applied for normal access (e.g., human-type communication devices as opposed to machine-type communication devices; normal UE is referred to as human-type communication device).

Based on 3GPP standards, the following requirements are considered:

EAB is a mechanism for the operator(s) to control Mobile Originating (MO) access attempts from UEs that are configured for EAB in order to prevent overload of the access network and/or the core network.

In congestion situations, the operator can restrict access from UEs configured for EAB while permitting access from other UEs.

UEs configured for EAB are considered more tolerant to access restrictions than other UEs.

When an operator determines that it is appropriate to apply EAB, the network broadcasts necessary information to provide EAB control for UEs in a specific area.

Further, the following requirements are also applied:

The UE is configured for EAB by the Home PLMN (HPLMN).

EAB shall be applicable to all 3GPP Radio Access Technologies.

EAB shall be applicable regardless of whether the UE is in a Home or a Visited PLMN.

Relevant information to enable the UE to perform EAB should be provided to the UE. In this description, such information is referred to as 'EAB information'. The EAB information should include the following information:

The EAB information shall define whether EAB applies to UEs within one of the following categories: a) UEs that are configured for EAB; b) UEs that are configured for EAB and are neither in their HPLMN nor in a PLMN that is equivalent to it; c) UEs that are configured for EAB and are neither in the PLMN listed as most preferred PLMN of the country where the UE is roaming in the operator-defined PLMN selector list on the SIM/USIM, nor in their HPLMN nor in a PLMN that is equivalent to their HPLMN.

Further, the EAB information shall also include extended barring information for Access Classes 0-9. For instance, various information can be included in the EAB information to restrict access UEs with various Access Classes. For instance, bitmap information in which respective bits represent whether a certain Access Class is barred can be included in the EAB information. In particular, 10-bit information each representing ACs 0-9 together with at least two bits representing a category of the UE can be included in the EAB information.

For DTA in 3GPP networks (e.g., 3GPP release 10), EAB is used to control the overload to Random Access Channel (RACH). The EAB is informed to UE's through per-AC (Access Class) based bitmap representation including three EAB categories (e.g., the above explained categories 'a' to 'c') for UE's. As explained above, EAB can be configured based on n-bit bitmap information, and ACB is based on the above-explained 'ac-BarringFactor' and 'ac-BarringTime'. The parameter 'ac-BarringFactor' is used to indicate the probability threshold by which the UE is supposed to be barred (e.g., if 'ac-BarringFactor' is set to 0.05, the probability of being barred is 0.05). The parameter 'ac-BarringTime' is used to indicate the length of time interval during which the UE is supposed to be barred and thus to wait for (e.g., if 'ac-BarringTime' is set to 4 sec, the UE should wait for that time period before taking next action).

The present description proposes a number of mechanisms in which 'normal access' and 'delay tolerant access (DTA)' are separately treated. Hereinafter, the behavior of UEs with normal access and UEs with delay tolerant access is discussed.

Figure 4:
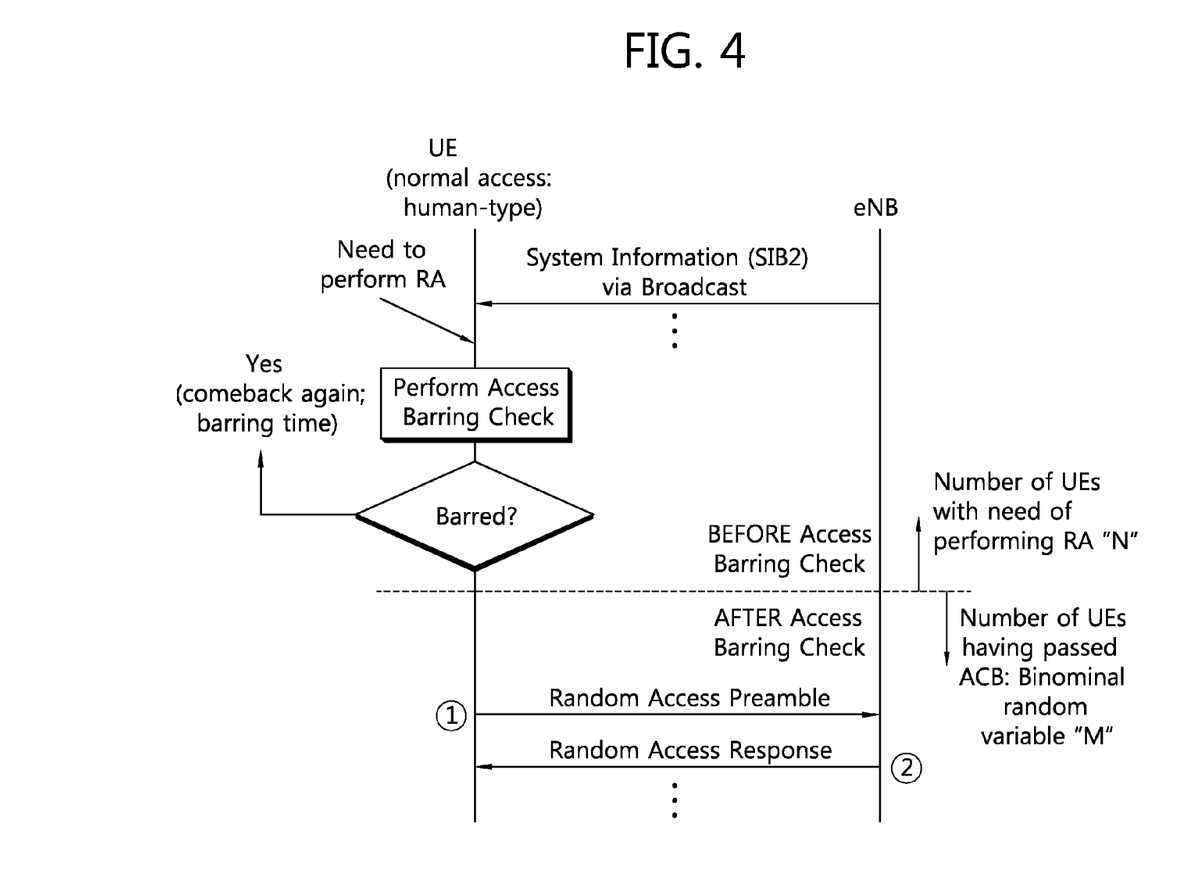
FIG. 4 is a flow diagram showing a random access procedure for normal access.

FIG. 4 is a flow diagram showing a random access procedure for normal access.

As shown in FIG. 4, the number of UEs which intends to perform random access (RA) can be referred to as 'N', and the number of UEs which have passed access class barring (ACB) can be referred to as 'M'. Actual behavior of UEs which attempt normal access is represented by a random variable, since 'M' is determined by mutually-independent random draws. Therefore, 'M' is modeled as a binomial random variable with two parameters ('N', and 'p'), where 'p' denotes a probability indicated by the parameter 'ac-BarringFactor'.

Figure 5:
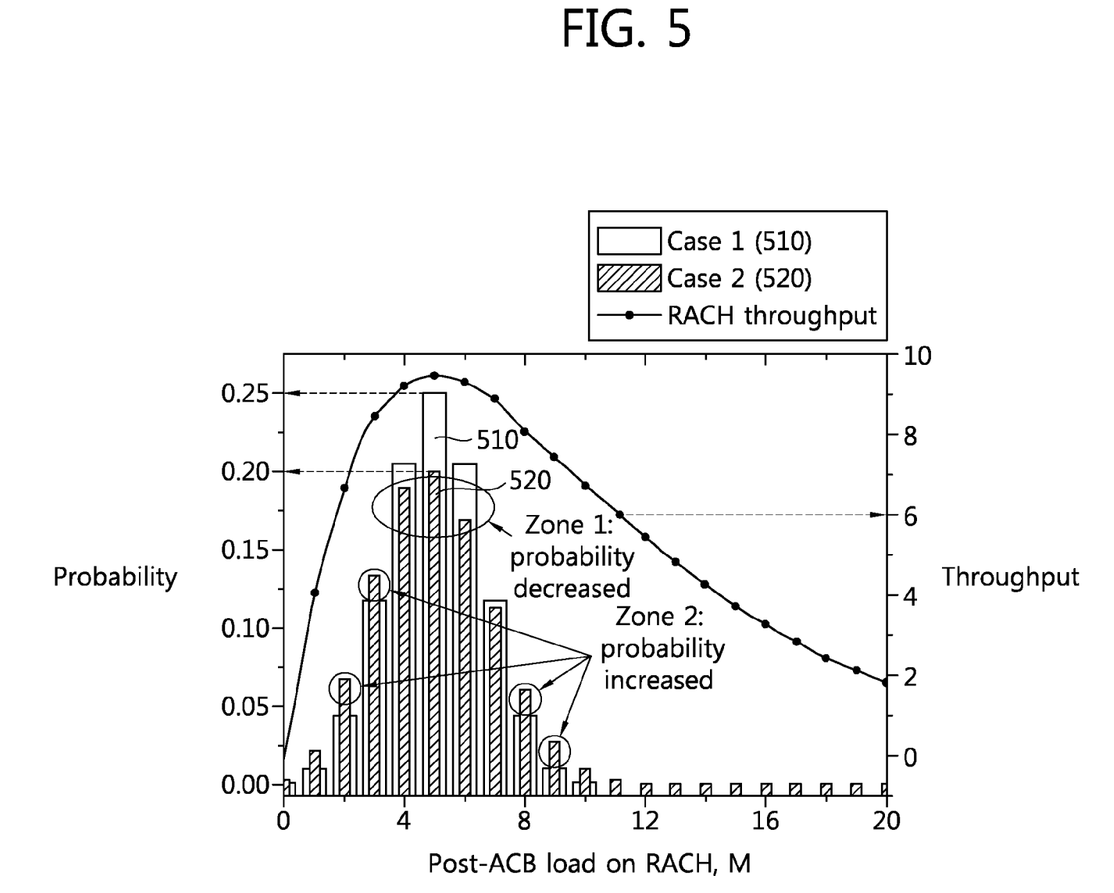
FIG. 5 shows randomness of RACH load caused by access class barring (ACB) operation.

FIG. 5 shows randomness of RACH load caused by access class barring (ACB) operation.

As shown in FIG. 5, two cases, i.e., a first case 510 where 'N' is set to '10' and 'p' is set to '0.50' and a second case 520 where 'N' is set to '20' and 'p' is set to '0.25'. In FIG. 5, bar graphs associated with the first case 510 show probability mass function (PMF) where 'N' is '10' and 'p' is '0.50', and bar graphs associated with the second case 520 show probability mass function (PMF) where 'N' is '20' and 'p' is '0.25'. In other words, each bar graph illustrates a probability of passing ACB and the total number of corresponding UEs which has pass the ACB. For instance, for the first case 510, the total number of UEs with 25% passing rate is assumed to be 5. Further, for a given number of UEs, RACH throughput is set in FIG. 5. For simplicity, the number of total RACH opportunities is assumed to be 5.

As illustrated in FIG. 5, for a given pair of 'ac-BarringFactor' and 'ac-BarringTime', the RACH load of normal access is affected by the number of normal UE's in need of performing RA ('N') and the 'ac-BarringFactor', which has a random nature. However, it should be noted that, for a given EAB bitmap, the RACH load of DTA is merely affected by the number of DTA UE's in need of performing RA.

Therefore, for a given pair of normal UEs (i.e., N1), and DTA UEs, (i.e., N2), it can be forecasted that the RACH load caused by normal UEs are randomly fluctuating whereas the RACH load caused by DTA UEs is constant (or substantially static). Therefore, it is beneficial that the RACH load control parameters (e.g., back-off interval) for normal access should be able to change adaptively whereas those for DTA do not have to be as adaptive as those for normal access.

To achieve the beneficial effects, the present description proposes a number of mechanisms in which 'normal access' and 'delay tolerant access (DTA)' are separately treated.

In detail, the first example of the present description proposes to use a separate back-off interval for DTA included in a random access response (so called 'Message 2').

For normal access, the back-off interval (indicating a back-off duration or back-off time value) is included the random access response. Namely, The random access response includes information on back-off, which is used for a back-off process. In particular, if a random access response with the transmitted preamble information is received by the UE, one of the UE's tasks is to read or obtain information on back-off interval (BI) from a header of a MAC PDU included in the random access response for the UE. After transmitting Message 3 (as shown in step S360), if there is no contention resolution, the UE will perform the back-off process by means of randomly choosing a wait-time value for the back-off before it retries for preamble (re-)transmission.

The UE receives or reads the BI index (i.e., BI value) in the received MAC PDU header, performs a random draw from a uniform distribution [0, BI value], and waits for the selected period of time before re-transmission of the random access preamble. Back-off time values indicating the upper limit of back-off time can be defined as the following table.

TABLE 1

| Index | Back-off Parameter value (ms) |
|---|---|
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | Reserved |
| 14 | Reserved |
| 15 | Reserved |

The present description further proposes a separate back-off interval for DTA, which is included in Message 2. Since uplink traffic transmitted through delay-tolerant access (DTA) may not be delay-sensitive, back-off intervals for DTA can be greater than those for normal access.

Back-off intervals (i.e., back-off time value or duration) for DTA can be predefined and represented by a 4-bit index, as Table 1. In one design, back-off intervals for DTA can be extended from Table 1 with a higher maximum value. Examples of back-off intervals for DTA include {0, 10, 20, 30, 40, 60, 80, 120, 160, 240, 320, 480, 960, 1920, 3840 (ms), Reserved, Reserved}, {0, 10, 20, 30, 40, 60, 80, 120, 160, 240, 320, 480, 960, 1920, 3840, 7680 (ms), Reserved}, {0, 10, 20, 30, 40, 60, 80, 120, 160, 240, 320, 480, 960, 1920, 3840, 7680, 15360 (ms)}

In another design, back-off intervals for DTA can be multiples of values of Table 1. For instance, back-off intervals for DTA can be {0×m, 10×m, 20×m, 30×m, 40×m, 60×m, 80×m, 120×m, 160×m, 240×m, 320×m, 480×m, 960×m, 1920 (ms)×m, Reserved, Reserved, Reserved}, where 'm' can be a integer or real value greater than one (1). Alternatively, the value 'm' can be a fraction, rather than a multiple.

In another design, back-off intervals for DTA can be based on various distribution functions different from the uniform distribution function, which is used for normal access. If the distribution function for DTA is designed to provide back-off values different from those provided by the uniform distribution function, back-off intervals for DTA can be separately managed.

Figure 6:
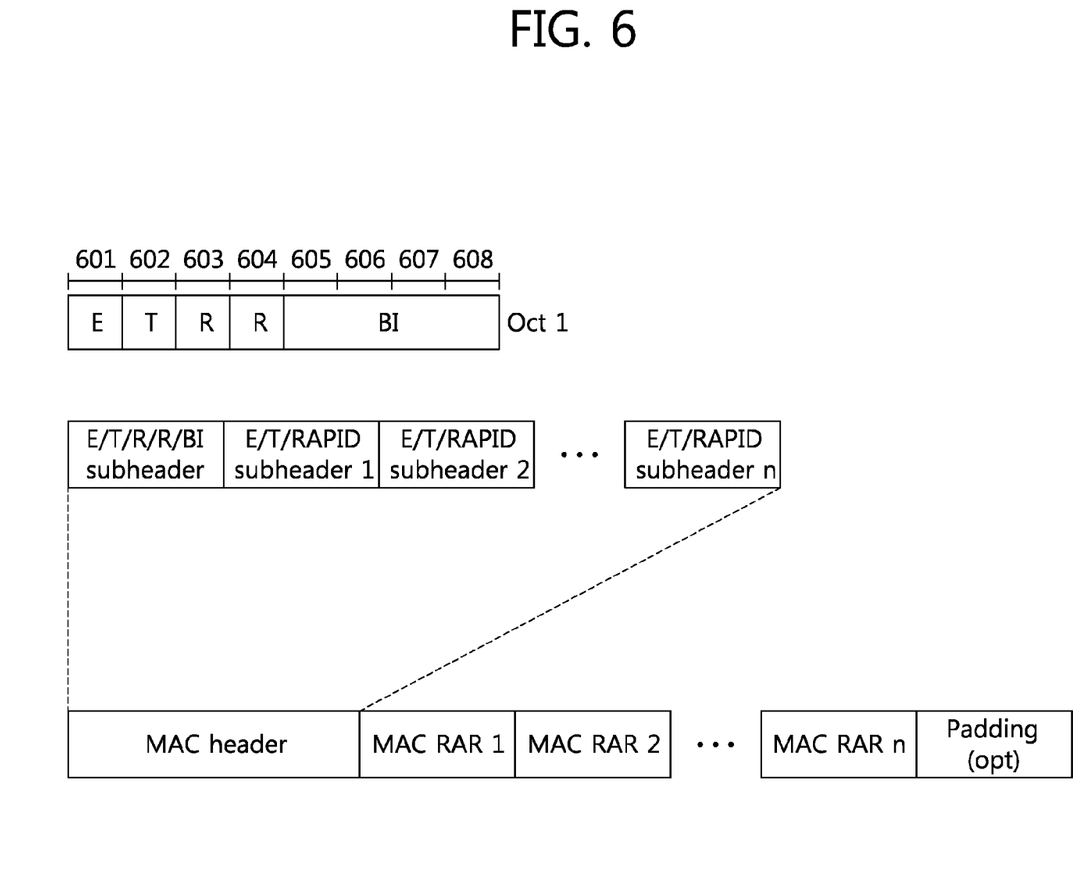
FIG. 6 is a block diagram showing an 'E/T/R/R/BI' field included in MAC header.

When two different types of back-off intervals are signaled, an 'E/T/R/R/BI' field can be used to signal the back-off intervals. FIG. 6 is a block diagram showing an 'E/T/R/R/BI' field included in MAC header.

As shown in FIG. 6, a first subheader included in the MAC header, which is included in a random access response, includes an 'E/T/R/R/BI' field.

The field BI 605-608 is a backoff indicator field. BI 605-608 identifies the overload condition in the cell. While an example shown in FIG. 6 discloses the size of the BI field is 4-bit, the size can be decreased or increased.

The field E 601 being an extension field is a flag indicating if more fields are present in the MAC header or not. The E field is set to '1' to indicate at least another set of E/T/RAPID fields follows. The E field is set to '0' to indicate that a MAC RAR or padding starts at the next byte.

The field T 602 being a type field is a flag indicating whether the MAC subheader contains a Random Access ID or a Backoff Indicator. The T field is set to '0' to indicate the presence of a Backoff Indicator field in the subheader (BI). The T field is set to '1' to indicate the presence of a Random Access Preamble ID field in the subheader (RAPID).

The fields R 603 and R 604 are reserved bits, which are usually set to '0'.

For instance, when a first type BI (for normal access) and a second type BI (for DTA) are explicitly signaled by the E/T/R/R/BI' field, an additional E/T/R/R/BI (not depicted in FIG. 6) can be further included. Namely, the additional E/T/R/R/BI subheader can be included between the original 'E/T/R/BI subheader' and 'E/T/RAPID subheader 1' in order to indicate BI for DTA.

Alternatively, the explicit signalling can be used without using the additional E/T/R/R/BI subheader. For instance, 'R 603, R604 and BI 605' of FIG. 6 can be used to indicate the second type BI and 'BI 606, BI 607 and BI 608' can be used to indicate the first type BI. In another design, it is also possible to only use R 603 and R 604 to indicate the second type BI. In this case, BI for normal access is configured based on 4 bits (605-608), and BI for DTA is configured based on 2 bits (604-604).

When implicit signalling is used, R 603 and R 604 fields are used to indicate the fraction number or multiple number. Alternatively, such fields can be used to indicate a type of distribution functions when a plurality of distribution functions are used. Further, a portion of BI (605-608) can also be used to signal the fraction/multiple or the type of distribution functions.

When a network configures a random access response (Message 2), two different types of back-off intervals can be included. Namely, a back-off interval for normal access and a back-off interval for DTA can be explicitly signaled to a UE. Alternatively, the back-off interval for DTA can be implicitly signaled. In this case, the UE can calculate (or derive) the back-off intervals for DTA from the explicitly signaled back-off interval for normal access. The fraction or multiple can be used when implicit signaling is used. If different distribution functions are used, the type of functions can be further signaled.

By doing so, the UE can configure the back-off interval for DTA, whether the back-off interval for DTA is explicitly included in Message 2 or not. When the back-off interval for DTA is configured (or calculated) by a UE supporting both the H2H and M2M communication, the UE can determine whether uplink traffic to be transmitted through the UE's random access is associated with normal access or DTA. Such determination can be performed based on a certain field or cause code included in various control signals, such as RRC signaling. If the UE's attempt is associated with normal access, the UE merely uses a back-off interval described in Table 1. However, if the UE's attempt is associated with DTA, the UE can configured back-off intervals for DTA by using explicit or implicit signaling.

Hereinafter, another example of the present description is further explained. In detail, the second example of the present description proposes to use separate 'preambleTransMax' values for normal accesses and DTA's. The 'preambleTransMax' can be included in system information, such as system information block type 2 (SIB2).

When the parameter 'preambleTransMax' which indicates a maximum number of preamble transmission is received, a UE can attempt random access preamble transmission until 'preambleTransMax' is reached. In the proposed scheme, the maximum numbers of preamble transmission are separately configured for both normal access and DTA.

The above features can be understood in the context of 3GPP standards as follows.

```
RACH-ConfigCommon information element
-- ASN1START
RACH-ConfigCommon ::=SEQUENCE { preambleInfo
        SEQUENCE {numberOfRA-Preambles
  ENUMERATED {n4, n8, n12, n16 ,n20, n24, n28, n32, n36, n40, n44, n48, n52,
n56, n60, n64},
    preamblesGroupAConfig      SEQUENCE {
    sizeOfRA-PreamblesGroupA   ENUMERATED {n4, n8, n12, n16 ,n20, n24,
n28, n32, n36, n40, n44, n48, n52, n56, n60},
    messageSizeGroupA          ENUMERATED {b56, b144, b208, b256},
    messagePowerOffsetGroupB   ENUMERATED {minusinfinity, dB0, dB5,
dB8, dB10, dB12, dB15, dB18},
                               ...
  }                            OPTIONAL
                                         -- Need OP
  },
    powerRampingParameters              SEQUENCE {
    powerRampingStep           ENUMERATED {dB0, dB2, dB4, dB6},
    preambleInitialReceivedTargetPower       ENUMERATED {dBm-120, dBm-
118, dBm-116, dBm-114, dBm-112, dBm-110, dBm-108, dBm-106, dBm-104, dBm-102,
dBm-100, dBm-98, dBm-96, dBm-94, dBm-92, dBm-90}
  },
    ra-SupervisionInfo         SEQUENCE {
    preambleTransMax           ENUMERATED {n3, n4, n5, n6, n7, n8, n10, n20, n50,
n100, n200},
    ra-ResponseWindowsize   ENUMERATED {sf2, sf3, sf4, sf5, sf6, sf7, sf8, sf10},
    mac-ContentionResolutionTimer        ENUMERATED {sf8, sf16, sf24,
sf32, sf40, sf48, sf56, sf64}
    preambleTransMaxDTA        ENUMERATED {n3, n4, n5, n6, n7, n8, n10,
n20, n50, n100, n200},
  },
    maxHARQ-Msg3Tx             INTEGER (1..8),
      ...
  }
-- ASN1STOP
```

With respect to the above operation, relevant parameters should be further defined as follows:

mac-ContentionResolutionTimer: Timer for contention resolution in TS 36.321. Value in subframes. Value sf8 corresponds to 8 subframes, sf16 corresponds to 16 subframes and so on.

maxHARQ-Msg3Tx: Maximum number of Msg3 HARQ transmissions in TS 36.321, used for contention based random access. Value is an integer.

messagePowerOffsetGroupB: Threshold for preamble selection in TS 36.321. Value in dB. Value minusinfinity corresponds to infinity. Value dB0 corresponds to 0 dB, dB5 corresponds to 5 dB and so on.

messageSizeGroupA: Threshold for preamble selection in TS 36.321. Value in bits. Value b56 corresponds to 56 bits, b144 corresponds to 144 bits and so on.

numberOfRA-Preambles: Number of non-dedicated random access preambles in TS 36.321. Value is an integer. Value n4 corresponds to 4, n8 corresponds to 8 and so on.

powerRampingStep: Power ramping factor in TS 36.321. Value in dB. Value dB0 corresponds to 0 dB, dB2 corresponds to 2 dB and so on.

preambleInitialReceivedTargetPower: Initial preamble power in TS 36.321. Value in dBm. Value dBm-120 corresponds to −120 dBm, dBm-118 corresponds to −118 dBm and so on.

preamblesGroupAConfig: Provides the configuration for preamble grouping in TS 36.321. If the field is not signalled, the size of the random access preambles group A is equal to numberOfRA-Preambles.

preambleTransMax: Maximum number of preamble transmission in TS 36.321. Value is an integer. Value n3 corresponds to 3, n4 corresponds to 4 and so on.

ra-ResponseWindowSize: Duration of the RA response window in TS 36.321. Value in subframes. Value sf2 corresponds to 2 subframes, sf3 corresponds to 3 subframes and so on.

sizeOfRA-PreamblesGroupA: Size of the random access preambles group A in TS 36.321[6]. Value is an integer. Value n4 corresponds to 4, n8 corresponds to 8 and so on.

preambleTransMaxDTA: Maximum number of preamble transmission for delay tolerant access (DTA) in TS 36.321. Value is an integer. Value n3 corresponds to 3, n4 corresponds to 4 and so on.

As disclosed above, each of the maximum numbers for normal access and DTA can be one of {3, 4, 5, 6, 7, 8, 10, 20, 50, 100, 200}. Alternatively, available maximum numbers for normal access can be differently set from those for DTA.

When using separate 'preambleTransMax' values for normal access and DTA, implicit signalling for DTA can be used, whereas explicitly signalling for DTA is available as shown above. For instance, if the UE is making DTA, the UE understands that the broadcast 'preambleTransMax' as a pre-configured number. Pre-configuration can be set by System Information, by a value (e.g., 10 times). Alternatively, other than the broadcast 'preambleTransMax', a fraction or multiple can be further provided to enable the UE to calculate the parameter 'preambleTransMaxDTA' by using the fraction (or multiple) and the broadcast 'preambleTransMax'.

In detail, the UE determines whether access attempted by the UE is normal access or delay tolerant access. As discussed above, such determination can be performed based on a certain field or cause code included in various control signals, such as RRC signaling. If the UE's attempt is associated with normal access, the UE uses parameters for normal access which are explicitly signaled. However, if the UE's attempt is associated with DTA, the UE calculates or derives DTA parameters from normal access parameters, which are explicitly signaled. In case where parameters for normal access are only signaled, signalling overhead can be reduced.

Figure 7:
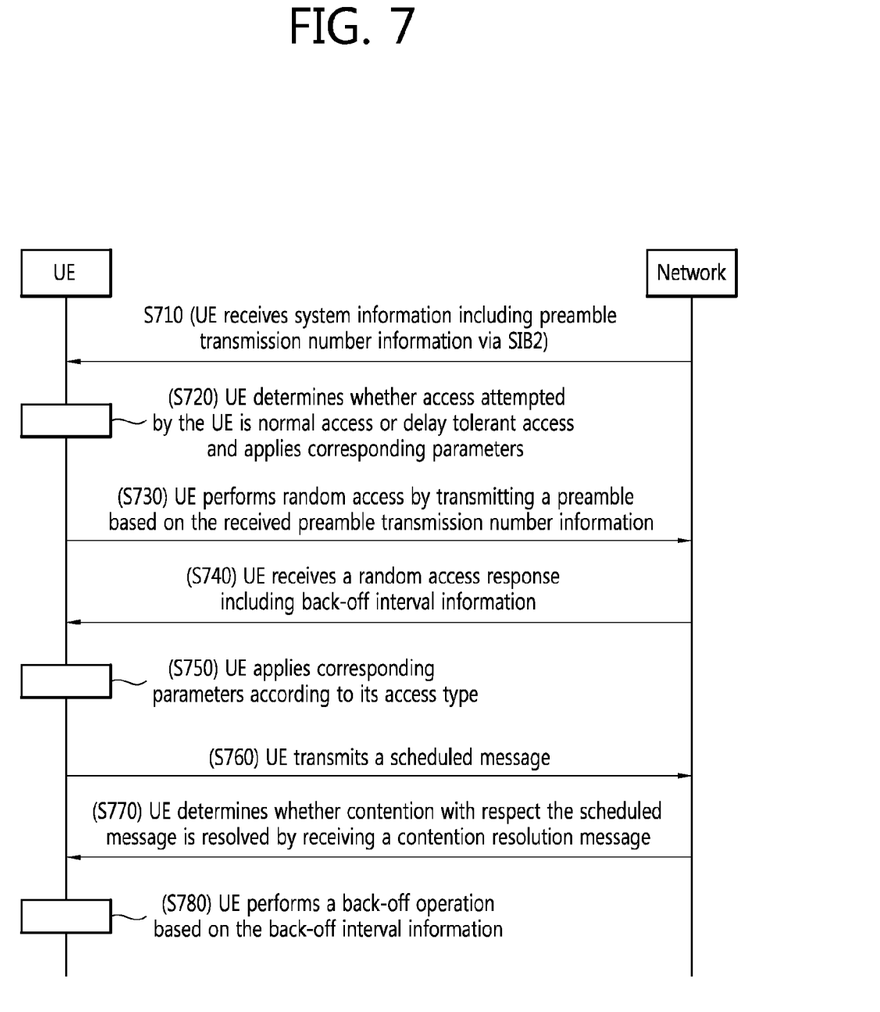
FIG. 7 is a flow chart describing a method of processing data related to contention-based random access.

FIG. 7 is a flow chart describing a method of processing data related to contention-based random access.

In step S710, a UE receives system information including preamble transmission number information via SIB2. The preamble transmission number information is used to indicate a first maximum number of preamble transmission applicable to a first type UE performing normal access (e.g., 'preambleTransMax') and a second maximum number of preamble transmission applicable to a second type UE performing DTA (e.g., 'preambleTransMaxDTA').

In step S720, the UE determines whether access attempted by the UE is normal access or delay tolerant access and applies corresponding parameters (e.g., 'preambleTransMax' or 'preambleTransMaxDTA') according to its access type. If the UE is not barred by ACB and/or EAB, a subsequent process is further performed.

In step S730, the UE performs random access by transmitting a preamble (e.g., 'Message 1') based on the received preamble transmission number information (e.g., 'preambleTransMax' or 'preambleTransMaxDTA').

In step S740, the UE receives, in response to the preamble, a random access response (e.g., 'Message 2') including back-off interval information, wherein the back-off interval information is used to indicate first type back-off interval information applicable to the first type UE (e.g., BO for normal access) and second type back-off interval information applicable to the second type UE (e.g., BO for DTA).

After UE applies corresponding parameters according to its access type (e.g., normal or delay-tolerant access) in S750, the UE transmits, in response to the random access response, a scheduled message (e.g., 'Message 3') in S760.

In step S770, the UE determines whether contention with respect to the scheduled message is resolved by receiving a contention resolution message (e.g., 'Message '4').

In step S780, if the contention is not resolved, the UE performs a back-off operation based on the back-off interval information.

Figure 8:
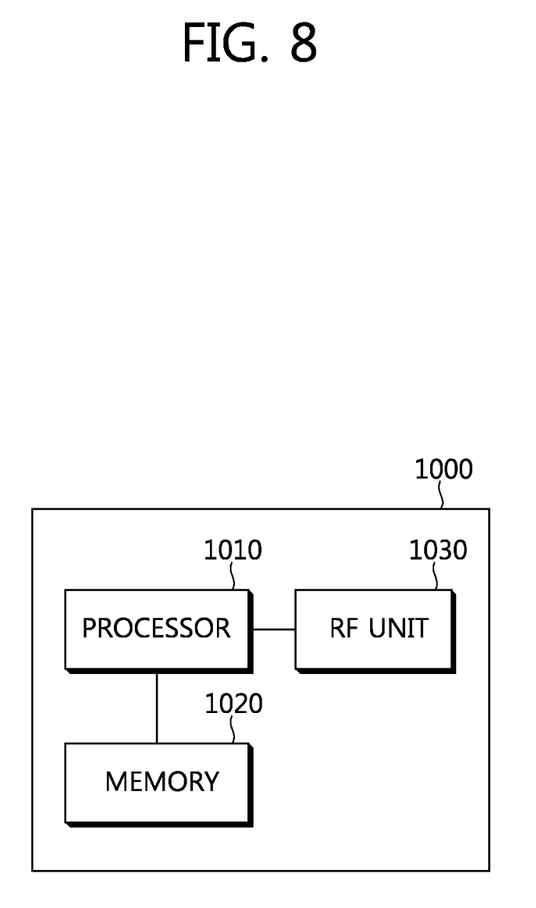
FIG. 8 is a block diagram showing a wireless apparatus to implement technical features of this description.

FIG. 8 is a block diagram showing a wireless apparatus to implement technical features of this description. This may be a part of a UE, an eNodeB/HeNodeB/HNodeB, or a core network (CN) entity. The wireless apparatus 1000 may include a processor 1010, a memory 1020 and a radio frequency (RF) unit 1030.

The processor 1010 may be configured to implement proposed functions, procedures and/or methods described in this description. Layers of the radio interface protocol may be implemented in the processor 1010. The processor 1010 may handle a procedure explained above. The memory 1020 is operatively coupled with the processor 1010, and the RF unit 1030 is operatively coupled with the processor 1010.

The processor 1010 may include application-specific integrated circuit (ASIC), other chipset, logic circuit and/or data processing device. The memory 1020 may include read-only memory (ROM), random access memory (RAM), flash memory, memory card, storage medium and/or other storage device. The RF unit 1030 may include baseband circuitry to process radio frequency signals. When the embodiments are implemented in software, the techniques described herein can be implemented with modules (e.g., procedures, functions, and so on) that perform the functions described herein. The modules can be stored in memory 1020 and executed by processor 1010. The memory 1020 can be implemented within the processor 1010 or external to the processor 1010 in which case those can be communicatively coupled to the processor 1010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of processing data related to contention-based random access in a wireless communication system using a number of orthogonal frequency division multiplexing (OFDM) symbols, the method performed by a user equipment (UE) and comprising:
receiving system information including preamble transmission number information via a system information block (SIB), wherein the preamble transmission number information is used to indicate a first maximum number of preamble transmission applicable to a first type UE performing normal access and a second maximum number of preamble transmission applicable to a second type UE performing delay tolerant access;
performing random access by transmitting a preamble based on the preamble transmission number information;
receiving, in response to the preamble, a random access response including back-off interval information, wherein the back-off interval information is used to indicate first type back-off interval information applicable to the first type UE and second type back-off interval information applicable to the second type UE;
transmitting, in response to the random access response, a scheduled message;
determining whether contention with respect to the scheduled message is resolved by receiving a contention resolution message; and
if the contention is not resolved, performing a back-off operation based on the back-off interval information.

2. The method of claim 1, wherein the first type back-off interval information indicates a first upper bound of a back-off duration associated with the back-off operation, wherein the second type back-off interval information indicates a second upper bound of the back-off duration.

3. The method of claim 1, wherein the first type UE is a human-to-human device and the second type UE is a machine-to-machine device.

4. The method of claim 1, wherein the system information is transmitted via radio resource control (RRC) signaling.

5. The method of claim 1, wherein the back-off interval information included in a MAC subheader of the random access response.

6. A user equipment (UE) for processing data related to contention-based random access in a wireless communication system using a number of orthogonal frequency division multiplexing (OFDM) symbols, the UE comprising:

a radio frequency unit configured to receive and transmit a signal:
a processor coupled to the radio frequency unit and configured to:
receive system information including preamble transmission number information via a system information block (SIB), wherein the preamble transmission number information is used to indicate a first maximum number of preamble transmission applicable to a first type UE performing normal access and a second maximum number of preamble transmission applicable to a second type UE performing delay tolerant access;
perform random access by transmitting a preamble based on the preamble transmission number information;
receive, in response to the preamble, a random access response including back-off interval information, wherein the back-off interval information is used to indicate first type back-off interval information applicable to the first type UE and second type back-off interval information applicable to the second type UE;
transmit, in response to the random access response, a scheduled message;
determine whether contention with respect to the scheduled message is resolved by receiving a contention resolution message; and
if the contention is not resolved, perform a back-off operation based on the back-off interval information.

7. A method of processing data related to contention-based random access in a wireless communication system using a number of orthogonal frequency division multiplexing (OFDM) symbols, the method performed by a user equipment (UE) and comprising:
receiving system information including preamble transmission number information via a system information block (SIB), wherein the preamble transmission number information indicates a first maximum number of preamble transmission applicable to normal access;
determining whether access attempted by the UE is normal access or delay tolerant access;
if the UE attempts the delay tolerant access, configuring a second maximum number of preamble transmission by using the first maximum number of preamble transmission, wherein the second maximum number of preamble transmission is applicable to the delay tolerant access;
performing random access by transmitting a preamble based on the preamble transmission number information;
receiving, in response to the preamble, a random access response including back-off interval information, wherein the back-off interval information is used to indicate first type back-off interval information applicable to the normal access;
if the UE attempts the delay tolerant access, configuring second type back-off interval information by using the first type back-off interval information, wherein the second type back-off interval information is applicable to the delay tolerant access;
transmitting, in response to the random access response, a scheduled message;
determining whether contention with respect to the scheduled message is resolved by receiving a contention resolution message; and
if the UE attempts the delay tolerant access, performing a back-off operation based on the second type back-off interval information when the contention is not resolved.

\* \* \* \* \*